United States Patent [19]

Hsu et al.

[11] Patent Number: 5,171,595
[45] Date of Patent: Dec. 15, 1992

[54] ANTIFOAM COMPOSITIONS FOR VEGETABLE EXTRACTS

[75] Inventors: Sheng-Hsuing Hsu; Scott Westfall, both of Marysville, Ohio

[73] Assignee: Nestec S.A., Vevey, Switzerland

[21] Appl. No.: 83,914

[22] Filed: Aug. 6, 1987

Related U.S. Application Data

[63] Continuation of Ser. No. 800,514, Nov. 21, 1985, abandoned.

[51] Int. Cl.⁵ .......................... A23L 2/38; A23F 3/16; A23F 5/24
[52] U.S. Cl. .................................... 426/329; 426/590; 426/594; 426/597
[58] Field of Search ................ 426/329, 590, 594, 597

[56] References Cited

U.S. PATENT DOCUMENTS

| | | | |
|---|---|---|---|
| 2,929,716 | 3/1960 | Barch et al. | 426/329 |
| 3,100,151 | 8/1963 | Breivik et al. | 426/329 |
| 4,293,581 | 10/1981 | Hirsbrunner et al. | 426/630 |

OTHER PUBLICATIONS

Sivetz, Coffee Processing Technology, vol. 2, 1963, The Avi Publishing Co., Inc.: Westport, Conn., pp. 122-123, 164-167, 175-182.
Swern, Bailey's Industrial Oil and Fat Products, 1964, Interscience Publishers: New York, p. 974.
Winton et al., The Structure and Composition of Foods, vol. IV, 1939, John Wiley & Sons, Inc.: New York, pp. 94-101, 109-111.

*Primary Examiner*—Joseph Golian
*Attorney, Agent, or Firm*—Vogt & O'Donnell

[57] ABSTRACT

An antifoam for incorporation with a vegetable extract is prepared by reacting a vegetable oil with calcium and magnesium cations which may be derived from ash of a vegetable material in an aqueous alkaline environment. The antifoam may be itself incorporated with a vegetable extract or may be mixed with a carrier oil and incorporated with liquid or dry vegetable extracts to form a vegetable extract composition of the present invention. Particularly useful in practicing the invention are extract, oil and ash derived from tea and coffee. Further advantages, particularly in the case of tea, derive from aromatics which may be incorporated in the carrier oil by contacting the carrier oil with an aqueous tea essence.

12 Claims, No Drawings

ANTIFOAM COMPOSITIONS FOR VEGETABLE EXTRACTS

This is a continuation application of copending application Ser. No. 06/800,514 filed Nov. 21 1985, now abandoned.

The present invention relates to suppression of foam associated with vegetable extracts and to aromatization of such extracts, particularly tea.

Beverages such as tea and coffee are commonly prepared by aqueous extraction of vegetable material such as tea leaves or roast and ground coffee beans. In industrial production of instant beverages, the liquid extract typically is dried to a powder form. The term "extract" as used in this disclosure, unless otherwise specifically indicated, includes both the liquid and dry forms.

Liquid vegetable extracts tend to foam and cause difficulties in handling during industrial processing. Also an unsightly foam may form when a dry vegetable extract is reconstituted with water by the consumer, or when a reconstitutable beverage is provided for sale in a dispenser which continually recirculates and sprays the beverage to dispense it.

Accordingly, there long has been need for an effective antifoaming agent or "antifoam" which can be incorporated into vegetable extracts to suppress foaming. Although certain commercially available antifoams are generally considered acceptable for use in foods and beverages, they may be regarded as foreign substances and thus often are considered undesirable. U.S. Pat. No. 3,100,151 suggests that an antifoam for use in coffee or tea may be prepared from vegetable oils such as coffee oil by reacting coffee oil with glycerine to form monoglycerides. The glycerine utilized in this process is not a naturally occurring constituent of the vegetable extract, and hence the antifoam includes appreciable amounts of a foreign substance.

SUMMARY OF THE INVENTION

The present invention provides an antifoam-containing vegetable extract composition and processes for making the antifoam and extract composition. Desirably the antifoam agent is derived principally or entirely from elements occurring from plants of the same species as the vegetable extract. The present invention thus provides effective foam suppression without introduction of undesired foreign substances into the vegetable extract.

According to one aspect of the present invention, an effective antifoam may be prepared by reacting a vegetable oil with a source of cations comprising calcium and magnesium, and combinations thereof, under alkaline conditions in the presence of water. The reaction products typically include calcium and/or magnesium salts of fatty acids in admixture with monoglycerides and diglycerides.

The vegetable oil, composed principally of triglycerides, is preferably derived from the same plant species as the extract. For example, tea seed oil may be used in making an antifoam tea extract composition, and coffee oil may be used in preparation of an antifoam coffee extract composition.

Preferably, the cation source is an ash of vegetable material of the same species as that from which the extract is made. Thus, ash of tea leaves or coffee beans, can be used as the cation source. Surprisingly, it has been found that the ash of the extracted vegetable material tends to form a more effective antifoam than the ash of unextracted vegetable material.

As a further embodiment, the antifoam is blended with an edible carrier oil before addition to the vegetable extract. The carrier oil renders the antifoam more fluid and hence facilitates addition to the extract in forming the vegetable extract-antifoam composition. It also has been determined that the carrier oil typically enhances the efficacy of the antifoam and that the antifoam tends to inhibit separation of the oil and formation of an unsightly oil slick upon reconstitution.

The present invention thus provides improved vegetable extract compositions which comprise incorporation of an effective amount of an antifoam, made by the aforesaid reaction, with a vegetable extract. Substances which enhance the aroma of the extract, referred to herein as "aromatics," may also be incorporated in the extract composition. The carrier oil may serve as a vehicle for both the antifoam and the aromatics.

According to a further aspect of the present invention, it has been found that edible oils, particularly tea seed oil, have a high affinity for the aromatics of tea. Accordingly, small quantities of oil will take up substantial amounts of tea aromatics upon contact with aqueous tea essence, to provide a potent aromatized oil. For example, tea aromatics may be blended with the carrier oil by contacting the oil with an aqueous essence of tea to transfer aromatics to the oil from the aqueous phase. The resulting aromatics-bearing oil is then separated from the aqueous phase before blending the oil with the antifoam.

Although the aromatization process preferably is combined with addition of the antifoam, the aromatization process may be employed without the antifoam. Thus, an improved process for aromatizing a dry tea extract and improved aromatized tea extract compositions are disclosed.

The foregoing and other objects, features and advantages of the present invention will be more readily apparent from the detailed description of preferred embodiments set forth below.

DETAILED DESCRIPTION OF THE PREFERRED EMBODIMENTS

The preferred cation source for use in preparation of an antifoam according to the present invention is the ash of a vegetable material. The ash preferably is obtained by combustion of the vegetable material. Dry vegetable material typically can be converted completely to ash by incineration for about 15 minutes with forced air flow of about 0.05 to 1.0 m³/min per kg of vegetable material. After combustion, the ash may be pulverized and/or sifted to remove or disperse any large lumps.

Preferably, the vegetable material used to make the ash is extracted with water before combustion. Antifoams made using the ash of extracted vegetable materials have been found to provide superior efficacy. Although the present invention is not limited by any theory of operation, it is believed that this superiority is related to a lower ratio of potassium to calcium and magnesium in the extracted vegetable material as compared to that found in unextracted material, as aqueous extraction of vegetable materials typically removes potassium at a greater rate than calcium and magnesium because potassium compounds are believed to be more soluble in water and more readily removed by leaching than are the calcium and magnesium compounds.

The amount of calcium and magnesium in a particular quantity of a cation source may be characterized by the parameter "total Ca +Mg," which is the sum of the number of moles of calcium and the number of moles of magnesium in the cation source. As it is believed that potassium ions may compete with and/or inhibit formation of the desired calcium and magnesium salts of fatty acids, the ratio of the number of moles of potassium to the total Ca +Mg in the ash preferably is less than about 1 and more preferably less than about 0.5. The ratio of potassium to calcium and magnesium in the ash may thus be reduced by leaching the ash itself with water, preferably at temperatures below about 20° C.

The quantity of cation source utilized in the reaction typically is selected to provide total Ca +Mg of at least 0.05 moles per kg of oil reacted. Total Ca +Mg of about 0.2 to about 1.5 moles per kg of oil reacted is preferred, and about 0.6 to about 1.0 moles per kg of oil more preferred. The mass of cation source required to provide a given total Ca +Mg will of course depend on the composition of the cation source. When spent tea ash is utilized as the cation source, about 28 grams to about 215 grams of ash per kg of oil preferably are employed, and the range of about 85 grams to about 145 grams spent tea ash per kg of oil is particularly preferred.

Sources of calcium and/or magnesium cations other than ash may also be used. Thus, the oxides and hydroxides of calcium and magnesium and mixtures of these materials may be employed. Antifoams made with mixtures of pure calcium and magnesium compounds as the cation source typically are similar in potency to antifoams derived from ash to provide the same molar amounts of calcium and magnesium to vegetable extract compositions made under similar conditions. Magnesium ions typically provide better antifoaming activity than like amounts of calcium ions or mixtures of calcium and magnesium ions. Therefore, as among the non-ash cation sources, magnesium compounds are preferred.

Water is included in the reaction mixture. Typically, at least about 10 grams of water are used per kg of oil and higher amounts, up to about 150 grams of water per kg of oil, are preferred.

The oil used in the reaction is an edible, triglyceride based vegetable oil preferably derived from the same plant species as the extract with which the antifoam will be combined. Thus, tea seed oil derived from the seeds of tea plants by physical expression or by solvent extraction, or coffee oil derived from coffee beans or coffee grounds by similar well known methods may be employed. Either unrefined or refined oils may be used.

The reaction step is performed by simply mixing the oil, water and cation source and maintaining the mixture under alkaline conditions at about room temperature, i.e., 20° C. or, preferably, at an elevated temperature. The antifoams produced by reaction at elevated temperatures typically are more potent than those made by reaction at room temperature. Reactions carried at elevated temperatures should be conducted in a closed vessel and/or under an inert gas atmosphere to inhibit oxidation of the oil. As the cation source ordinarily includes highly alkaline oxides and/or hydroxides of calcium and magnesium, the cation source itself may serve to maintain the desired alkaline conditions in the reaction mixture. The reaction mixture preferably is agitated to maintain intimate admixture of the ingredients.

At temperatures below about 65° C., the reaction proceeds to only a limited extent, and tends to cease after about 1-2 hours regardless of whether any unreacted cation source is present. After reaction at temperatures below about 65° C., the reaction mixture typically is an oily liquid, slightly more viscous than was the original oil before reaction. Unrefined oils typically provide a somewhat greater increase in viscosity and form somewhat more potent antifoams than refined oils if the reaction is performed at temperatures below about 65° C. It is accordingly believed that the principal reactions at such temperatures involve formation of salts from free fatty acids present in the oil before commencement of the reaction, and that most of the monoglycerides and diglycerides found in the mixture after reaction are those which were present in the oil before reaction.

The reaction proceeds more rapidly and to a greater extent when the reaction mixture is maintained at an elevated temperature, preferably above 65° C. and most preferably between about 100° C. and about 180° C. At temperatures above about 65° C., refined and unrefined oils provide substantially the same results. It is accordingly believed that at such temperatures, there is substantial hydrolysis of the triglycerides in the oil to form monoglycerides and diglycerides and also to form free fatty acids which in turn react with the calcium and magnesium cations to yield the calcium and magnesium salts.

The speed at which the reaction proceeds varies with the precise temperature employed, the amounts of water and cation source included in the reaction mixture, the type of cation source and the degree to which the cation source is dispersed in the oil. Ash typically provides a somewhat slower reaction than an equivalent amount of pure oxides or hydroxides of calcium and magnesium.

The reaction preferably is arrested before all of the fatty acid moieties present in the oil are converted to salts. When the preferred amounts of cation source are employed, the speed of the reaction declines as the cation source is consumed, and the preferred amounts of cation source, mentioned above, contain less calcium and magnesium than would be required for full conversion of the fatty acid moieties of the oil to salts. Thus, appreciable amounts of monoglycerides and diglycerides remain in the mixture at the end of the reaction. Some unreacted triglycerides may also be present in the mixture after reaction.

Ordinarily, the reaction at elevated temperature is interrupted by cooling the mixture to room temperature before the calcium and magnesium in the cation source are completely consumed, which is after about 20 minutes to about 36 hours and preferably after about 8 to 24 hours. Any further reaction which may occur after reaction at elevated temperature, and cooling, typically is inconsequential. After reaction at elevated temperature and cooling to room temperature, the mixture has a waxy semi-solid to solid consistency with a distinct yield point.

The product of the reaction may be employed as is, without further modification, as an antifoam. Ordinarily, the product of the reaction step contains minor amounts of unreacted calcium and/or magnesium compounds and, when ash is utilized as the cation source, particles of other, unreacted ash components. The minor amounts of such substances introduced into a vegetable extract composition by addition of an effective amount of antifoam typically have no appreciable adverse effect on the composition. If desired, unreacted calcium and magnesium compounds and/or ash particles may be removed from the antifoam by settling, by centrifugation or, preferably, by filtration.

The antifoam may be dispersed in a liquid vegetable extract by forcing a mixture of a portion of a liquid extract and antifoam through a nozzle under pressure to form an emulsion of antifoam and extract, and then mixing the emulsion with the remainder of the liquid extract. When the antifoam is solid or semi-solid at room temperature, it may be melted by heating, typically to about 65° C., or it may be blended with a liquid carrier oil to facilitate the emulsification step.

A dry, powder-form extract composition may be made by drying the mixture of liquid extract and antifoam. When the antifoam is incorporated in the composition before drying, the degree of foam suppression achieved by a given amount of antifoam varies with the drying method employed. Drying methods such as vacuum drying, drum drying and the like which do not subject the mixture to high shear rates generally give better results than spray drying by conventional methods, which expose the mixture to extremely high shear rates in an atomizing nozzle. Good results may be achieved by spray drying the major portion of the liquid extract without the antifoaming agent, adding the antifoaming agent to the remaining portion of liquid extract and drying the extract-antifoam composition mixture by a method which does not involve high shear rates to form a second powder, and then blending the first and second powders.

Addition of the antifoam by contacting it with a dry powder-form extract typically provides a superior foam supression extract composition. Preferably, the antifoam is incorporated into a dry, powder-form extract composition as by spraying the antifoam onto the powder. It is believed that when the antifoam is incorporated by contacting the powder, the antifoam is distributed principally at or near the surfaces of the individual powder particles. Accordingly, it is believed that, upon reconstitution, the antifoam is available to suppress foaming before the bulk of the dry extract components is dispersed in the liquid phase.

When the physical properties of the antifoam do not lend the antifoam to effective spraying, the antifoam may be incorporated in a liquid blend which is then sprayed onto the powder. Thus, the antifoam may be emulsified with water or a mixture of water and vegetable extract solids. The solids tend to facilitate formation of a stable, sprayable emulsion. The resulting emulsion is then sprayed onto the powder. As the water in the emulsion adds moisture to the final product, the minimum amount of water required to form the emulsion should employed. With typical antifoams, acceptable emulsions may be formed from about 3.5 parts by weight water and about 1.5 parts by weight vegetable extract solids for each part by weight of antifoam.

Preferably, the blend used for spraying comprises a mixture of the antifoam and an edible carrier oil. Antifoams according to the present invention typically are miscible with edible oils. Thus, the viscosity of the blend can be controlled as desired by selecting appropriate proportions of oil and antifoam. The carrier oil preferably is an oil derived from the same plant species as the vegetable extract to which the antifoam is applied.

The amount of oil required to achieve an acceptably low viscosity for spraying will depend upon the spraying technique and equipment utilized and also upon the consistency of the antifoam. Use of about one part by weight oil to each part by weight antifoam provides a liquid blend which can be applied with ordinary spraying equipment. Typically, the amounts of oil required to produce a sprayable blend are small enough that they create no adverse effects in the extract composition. Water, or a mixture of water and vegetable extract solids, may be mixed or emulsified with an antifoam/oil blend if desired, further to reduce the viscosity of the blend.

An effective amount of antifoam employed in an extract composition according to the present invention will vary with the composition of the antifoam, the method by which the antifoam is incorporated in the extract composition, the properties of the vegetable extract and the degree of foam suppression desired. Typically, incorporation of about 0.01% to about 1.5% antifoam by weight, based on the weight of vegetable extract solids in the composition provides satisfactory foam suppression. With the preferred antifoams incorporated in a dry tea extract, by spraying a blend including both oil and antifoam on the extract powder, about 0.05% to about 0.2% by weight antifoam is particularly preferred.

The degree of foam suppression achieved can be determined by a "foam drained weight test" or by a "foam collapse time test." In the foam drained weight test, 600 ml of a liquid extract composition, or of a dry extract composition reconstituted in the normal fashion with water, are placed into an ordinary one liter laboratory sepratory funnel at room temperature. The funnel is then shaken vigorously for 10 seconds and immediately placed in an upright position, with the stopcock at the bottom, whereupon the stopcock is opened and the liquid is drained. When the liquid/foam interface reaches the stopcock, the stopcock is closed and the weight of the remaining foam in grams is determined.

In the foam collapse time test, 1 gram of a dry extract composition is placed in the bottom of a drinking glass of 360 ml capacity, about 14 cm high and about 6.5 cm in diameter at the top. The extract is reconstituted by directing a 120 ml/second stream of tap water at about 18° C. into the glass so that it initially impinges directly on the powder. When the top of the foam head reaches the top of the glass, the stream is stopped. The time in seconds, from termination of the stream until a clear spot, without foam, is visible at the top of the liquid layer, is taken as the foam collapse time.

Foam drained weight values and foam collapse time values stated herein should be taken as determined according to these methods and in either method, the lower the value, the greater the foam suppression.

The same carrier oil utilized in incorporation of the antifoam may also be employed to incorporate aromatics into the vegetable extract composition. The amount of oil required to serve as a carrier for both the aromatics and the antifoam typically is no greater than that required to serve as a carrier for the aromatics alone.

The technique of adding aromatics recovered from roast and ground coffee by distillation to instant coffee by blending the aromatics with an edible carrier oil and spraying the blend onto a dry coffee extract is well known. Similar techniques may be employed to apply aromatics in conjunction with antifoams according to the present invention. Thus, distilled coffee aromatics may be blended with the carrier oil and the antifoam and the resulting mixture may be sprayed onto a dry coffee extract powder. Antifoams according to the present invention may also be employed in aromatization of coffee with encapsulated oil/aromatics mixtures. The antifoam may be blended with an aromatics-laden oil and droplets of the resulting mixture may be encapsulated in shells of coffee solids or other carbohydrates. The capsules containing oil, aromas and antifoam are mixed with the dry coffee extract, thus incorporating the antifoam and aromas in the extract composition.

Oil slick formation has been a significant problem heretofore with certain instant coffee compositions aromatized by addition of aromatics in a carrier oil. Upon reconstitution, the oil tends to separate from the aqueous phase and form a slick on the top of the beverage. The present antifoams tend to inhibit separation of oil and formation of an oil slick upon reconstitution of the extract.

Although instant coffee has been aromatized with aromatics/oil blends, instant tea typically has not been so treated heretofore. According to a further aspect of the present invention, instant tea may be aromatized with a tea aromatics/oil blend. Tea aromatics may be incorporated in a carrier oil, preferably tea seed oil, by contacting the oil with an aromatics-bearing aqueous essence of tea to transfer aromatics from the essence to the oil and then separating the resulting aromatics-bearing oil from the aqueous phase. The aqueous essence may be prepared by steam distillation of black tea leaves or, preferably, by steam stripping liquid aqueous tea extract.

The oil may be contacted with the aqueous tea essence in a batch or continuous operation. Continuous contacting in a vertically extensive column with the oil phase moving upwardly and the aqueous essence phase downwardly in countercurrent flow is preferred. The column preferably is equipped with agitators spaced along its length to assure intimate admixture between the oil and aqueous phases. The outgoing aromatized oil can be separated by flotation from the incoming aqueous extract at the top of the column, and the outgoing aromatics-depleted essence may be separated from the incoming oil at the bottom of the column in similar fashion. The residence time of the oil in the column typically is about 1 minute, whereas the residence time of the aqueous essence typically is about 12 minutes. The results achieved in these contacting and separation steps do not appear to vary appreciably with temperature within the range of about 20° C. to about 60° C.; all temperatures within that range are equally workable, and other temperatures may also be employed. The aromatics-depleted essence may be added to liquid tea extract to enable recovery of residual tea constituents remaining in the essence after the contacting step.

This aspect of the present invention incorporates the discovery that proportions of aromatics appropriate to provide a desirable aroma in the final product typically are taken up by the oil in the contacting operation. Moreover, it has been found that large amounts of tea aromatics can be captured in very small quantities of oil by the process according to this aspect of the present invention. Accordingly, the desired amounts of aromatics may be added to a dry tea extract without introducing excessive amounts of oil. Thus, the amount of aromatized oil which is added to the extract is influenced by organoleptic considerations rather than by any undesirable effect of the oil.

The aromatics content of a tea essence may be expressed as "% strip" which is the weight of the essence expressed as a percentage of the weight of the tea stripped. Thus, a 4% strip essence comprises aromatics from 100 parts by weight tea leaves in 4 parts by weight essence, and a 2% strip essence comprises aromatics from 100 parts by weight tea leaves in 2 parts by weight essence. 2% to 4% strip essences are preferred. Each part by weight of oil will take up the aromatics from as many as 15 parts by weight or more of such essences. Thus, the ratio by weight of aqueous essence to oil utilized in the contacting step may be up to about 15:1 or more, essence:oil ratios between about 8:1 and about 15:1 being particularly preferred. When the preferred essence:oil ratios are utilized with the preferred essences, the aromatics from 100 parts by weight of tea leaves are taken up by about 0.13 to about 0.5 parts by weight of oil.

The amount of aromatics added to a dry tea extract may be expressed as "percent of stoichiometry." At 100% stoichoimetry, aromatics derived from 100 parts by weight of tea leaves are incorporated in the dry extract derived from 100 parts by weight of tea leaves; at 50% stoichiometry, aromatics derived from 50 parts by weight of tea leaves are incorporated in the dry extract derived from 100 parts by weight of tea leaves and so on. With the aromatization method of the present invention, aromatization levels below about 50% stoichiometry are preferred, and levels between about 10% and about 25% stoichiometry are particularly preferred to produce a dry extract composition having the most pleasing aroma. With the preferred, highly concentrated aromatized oil of the present invention, considerably less than 0.5% oil by weight based on the weight of dry tea extract is required to provide the desired level of aromatization.

The aromatics-bearing oil may be added to a tea extract composition in powder form by contacting the oil with the powder. Preferably, the aromatics-bearing oil is utilized as the carrier oil in applying the antifoam agent according to the present invention. Thus, the aromatics-bearing oil may be blended with the antifoam and the blend sprayed onto instant tea powder. In addition to the antifoam inhibiting oil slick formation upon reconstitution of the product, application of the blended antifoam and aromatics-bearing oil provides an aromatized powder with a more balanced and pleasant aroma than application of the same aromatics-bearing oil without antifoam. The improvement in aroma achieved by use of the antifoam is unexpected, inasmuch as the antifoam itself typically has no appreciable aroma.

Thus, to provide a dry tea extract with a more balanced and pleasant aroma, an aromatics-bearing oil, with or without antifoam, is mixed with an aqueous tea extract. From about 1 to about 3, and preferably about 1.5 to about 2, parts by weight of aqueous tea extract of from about 25% to about 50%, and preferably from about 30% to about 45%, tea solids per part by weight of aromatic-bearing carrier oil are blended with the oil.

Corresponding advantages may be achieved by addition of antifoam and/or aromatized oil to vegetable extract compositions which include other ingredients such as sugar together with lemon essence, as commonly included in iced tea mixes, or with chicory extracts, or sugar, commonly included with coffee extracts.

Also, although the reaction between the calcium and/or magnesium cation source and oil provides a simple and effective method of making an antifoam containing an effective combination of substances, other less desirable methods can be employed to make a similar antifoam. In one such alternative procedure, a vegetable oil is partially hydrolyzed with a mineral acid and water to form a mixture of free fatty acids, monoglycerides and diglycerides. After neutralization of the acid and precipitation of the resulting mineral salts, the fatty acids are saponified with calcium and magnesium. Also, cation sources other than calcium and magnesium sources can be used in a distinctly less desirable modification of the reaction between oil, cation source and water under alkaline conditions. Although antifoams made with cations other than calcium and magnesium have some foam-suppressing effect, such antifoams lack the calcium and/or magnesium salts found in the preferred antifoams, and hence are markedly less effective.

The following examples are for purposes of illustrating certain aspects of the present invention. Unless otherwise indicated, all parts, ratios and percentages are by weight.

EXAMPLE 1

Black tea leaves are extracted with water according to a conventional extraction process. 186.1 parts by weight of spent tea leaves produced as a byproduct of the extraction process are burned to ash, pulverized and sifted through a 325 mesh screen. 4.84 parts by weight of the sifted ash are mixed with 40.3 parts by weight tea seed oil and 4.84 parts by weight water. The mixture is reacted at 121° C. for 8 hours to produce 50 parts by weight of an antifoam.

Part of the aqueous extract is stripped of aromatics by bubbling steam through the extract, and 562.5 parts by weight of a 3% strip aqueous tea distillate are condensed. The stripped extract is blended back with the remainder of the extract. The distillate is contacted with tea seed oil at a distillate:oil ratio of 12:1 by weight in a vertical continuous countercurrent extraction column. 46.9 parts by weight of aromatized tea seed oil are recovered at the top of the column. The aromatic-depleted distillate is mixed back with the remainder of the aqueous extract.

The aromatized oil is blended with the antifoam. A small portion of the aqueous extract is adjusted to 37% tea solids by weight, and 194.5 parts by weight of the adjusted extract are blended with the antifoam and aromatized oil. The blend of antifoam, aromatized oil and tea liquor is continually recirculated through a mixer to maintain homogeneity.

The remainder of the aqueous tea extract is spray dried via a conventional process to provide approximately 50,000 parts by weight of a dry tea extract powder. The antifoam/aromatized oil/tea extract blend is contacted with the dry extract by forcing the blend under pressure through a filter and then through a nozzle having fine orifices arranged to spray the blend outwardly in a flat circular pattern while passing the powder in an annular stream around the nozzle. The composition resulting from the contacting operation includes 0.1% antifoam and 0.09% aromatized oil based on the weight of the dry extract, and is aromatized at 15% of stoichiometry.

The composition has a foam collapse time of 5.24 seconds. By comparison, a first control dry tea extract prepared by the same aqueous extraction and spray drying processes, without stripping any portion of the extract and without addition of any antifoam or any aromatized oil, has a foam collapse time in excess of 200 seconds. A second control sample prepared by the same procedures with the aromatized oil but without the antifoam has a foam collapse time of approximately 60 seconds.

A strong, distinct tea aroma is perceived upon opening the jars containing the composition. In sensory evaluation tests, the aroma of the composition with aromatized oil and antifoam is preferred over those of both controls.

EXAMPLE 2

Two samples of a dry tea extract composition are prepared substantially in accordance with the procedure of Example 1, but different cation sources are used in the reaction step to make the antifoam. One sample is made with using a cation source consisting of calcium hydroxide and magnesium hydroxide proportioned to provide the same number of moles of calcium and the same number of moles of magnesium as provided by the ash utilized in Example 1. The second sample is made using a cation source consisting of potassium hydroxide in an amount to provide a molar amount of potassium ions per kg of oil equal to the total molar amount of calcium, magnesium and potassium per kg of oil provided by the ash used in Example 1. The sample made with a calcium hydroxide and magnesium hydroxide cation source has a foam collapse time of 6.0 seconds, whereas the sample made with potassium hydroxide has a foam collapse time of 17.8 seconds.

EXAMPLE 3

The process of Example 1 is repeated under the same conditions save that the oil, ash and water mixture is maintained at 121° C. for 24 hours rather than 8 hours as in Example 1. 12.5 parts by weight of the resulting antifoam are blended with 42.5 parts by weight of the aromatized oil and 115 parts by weight of 37% solids tea extract, and the resulting blend is sprayed onto 50,000 parts by weight dry tea extract, instead of the blend used in Example 1. The resulting composition thus includes 0.025% by weight antifoam and 0.085% by weight aromatized oil, providing aromatization at approximately 14% of stoichiometry. The composition has a good tea aroma and a foam collapse time between 4 and 7 seconds.

EXAMPLE 4

3.2 parts by weight calcium hydroxide are dispersed in 8 parts by weight distilled water and the dispersion is added to 600 parts by weight tea seed oil to form a reaction mixture. The reaction mixture is held at 177° C. for 30 minutes under a carbon dioxide atmosphere in a closed vessel. The reaction mixture is then cooled rapidly and unreacted calcium hydroxide is separated by settling. The supernatant fluid recovered from the settling step is an oily liquid antifoam. The antifoam is applied to a dry, powder-form tea extract by spray contacting so that the resulting composition includes about 0.17% by weight antifoam. The foam collapse time is about 5-10 seconds. The foam collapse time of the dry extract without the antifoam is in excess of 200 seconds.

EXAMPLE 5

In each of 3 tests, 50 grams of the tea seed oil are reacted with 0.5 grams of a cation source and 2.0 grams of water at 54° C. for 20 minutes, and the resulting antifoam is spray contacted with the same dry tea extract in the same proportion, viz., 3 ml of antifoam to 454 grams of dry tea extract. The compositions of the cation sources utilized in the tests, and the foam drained weight of the treated dry tea extracts are as follows:

TABLE I

| RUN | CATION SOURCE | | FOAM DRAINED WEIGHT (grams) |
|---|---|---|---|
| | $Ca(OH)_2$ (grams) | $Mg(OH)_2$ (grams) | |
| A | 0.5 | 0.0 | 19.3 |
| B | 0.0 | 0.5 | 8.17 |
| C | 0.25 | 0.25 | 17.66 |

By comparison, the dry tea extract without antifoam has a foam drained weight of 30.7 grams.

EXAMPLE 6

Each of two antifoams is prepared by reacting 12 grams of tea leaf ash, 12 grams of water and 100 grams of tea seed oil at 121° C. for 60 minutes. All ingredients and conditions are the same as between the two antifoams, save that one antifoam is prepared using the ash of unextracted black tea leaves and the other antifoam is prepared using the ash of spent black tea leaves. Each antifoam is made into a sprayable emulsion by mixing 10 grams of the antifoam with 35 grams of water and 15 grams of dry tea extract. Each emulsion is spray contacted with aliquots of the same dry tea extract, in each case, to add 0.44% by weight of the antifoam to the dry tea extract, based on the weight of the dry extract. The extract treated with the antifoam produced using spent tea leaf ash has a foam drained weight of 5.36 grams, whereas the extract treated with antifoam made from the ash of unextracted black tea leaves has a foam drained weight of 12.48 grams.

EXAMPLE 7

Spent coffee grounds are dried and incinerated. The ash is leached with cold water until the ratio of potassium to total Ca +Mg in the ash drops to 0.5 and then dried. An antifoam is prepared by reacting 200 grams of the leached ash with 120 grams of water and 1 kg of refined coffee oil at 121° C. for 8 hours. The antifoam is added to an aqueous coffee extract containing 40% solids by weight by emulsifying the antifoam with a small aliquot of the extract and mixing the emulsion with the remainder of the extract to provide 6.0 grams of antifoam per kg of extract, or 1.5% by weight antifoam based on the weight of coffee solids in the extract. The treated extract exhibits distinctly less foaming than the same extract, which is untreated, when pumped into a tank, and approximately from one-third to one-half more treated extract, by volume, as compared with untreated extract, can be pumped into and contained without foam overflow.

What is claimed is:

1. A process comprising reacting ash of a water-extracted vegetable material and an edible, triglyceride-based vegetable oil in the presence of water under alkaline conditions at elevated temperature for obtaining a reaction product and then incorporating the reaction product with a vegetable extract to be consumed as a beverage.

2. A process comprising leaching ash of a vegetable material with water for obtaining leached ash having a ratio of moles of potassium to a total number of moles of calcium and magnesium of less than about 1, reacting the leached ash with an edible, triglyceride-based vegetable oil in the presence of water under alkaline conditions at elevated temperature for obtaining a reaction product and then incorporating the reaction product with a vegetable extract to be consumed as a beverage.

3. A process comprising incorporating a product of a reaction carried out in the presence of water under alkaline conditions at elevated temperature between an oil of a vegetable material and an ash of a vegetable material, wherein the ash has a ratio of moles of potassium to a total number of moles of calcium and magnesium of less than about 1, with a vegetable extract to be consumed as a beverage in an amount effective to suppress foam formation by the extract.

4. A process according to claim 2 or 3 wherein the ash is ash of water-extracted vegetable material.

5. A process according to claim 1 or 2 or 3 wherein the extract, the ash and the oil derived from plants of the same species.

6. A process according to claim 1 or 2 or 3 wherein the vegetable material is selected from a group consisting of coffee and tea.

7. A process according to claim 1 or 2 or 3 wherein the extract is a liquid and the reaction product is incorporated with the extract by forming an emulsion of the product and a portion of the extract and then mixing the emulsion with the remainder of the extract.

8. A process according to claim 7 further comprising incorporating a carrier oil with the reaction product and extract.

9. A process according to claim 1 or 2 or 3 wherein the extract is in a dry powder form and the reaction product is incorporated by spraying it on the extract.

10. A process according to claim 1 or 2 or 3 wherein the reaction product is incorporated with the extract in an amount of from about 0.01% to about 1.5% by weight based upon the weight of extract solids.

11. A process according to claim 1 or 2 or 3 wherein the vegetable material is teal and the reaction product is incorporated with the tea in an amount of from about 0.05% to about 0.02% by weight based upon the weight of extract solids.

12. A process according to claim 2 or 3 wherein the amount of the total moles of calcium and magnesium reacted with the oil is from about 0.2 moles to about 1.5 moles per kg of oil and wherein the reaction is carried out at a temperature above 65° C. and is interrupted by cooling to room temperature before calcium and magnesium in the ash are completely consumed in the reaction.

* * * * *

UNITED STATES PATENT AND TRADEMARK OFFICE
CERTIFICATE OF CORRECTION

PATENT NO. : 5,171,595
DATED : December 15, 1992
INVENTOR(S) : Sheng-Hsiung HSU, et al.

It is certified that error appears in the above-identified patent and that said Letters Patent is hereby corrected as shown below:

Column 12, line 26, (line 2 of claim 5), after "oil" insert --are--.

Column 12, line 47, (line 2 of claim 11), "teal" should be --tea--.

Column 12, line 49, (line 4 of claim 11), "0.02%", should be --0.2%--.

Signed and Sealed this

Nineteenth Day of October, 1993

Attest:

BRUCE LEHMAN

Attesting Officer    Commissioner of Patents and Trademarks